United States Patent
Ebata

(10) Patent No.: US 10,854,062 B2
(45) Date of Patent: Dec. 1, 2020

(54) FIRE MONITORING SYSTEM

(71) Applicant: HOCHIKI CORPORATION, Tokyo (JP)

(72) Inventor: Hiromichi Ebata, Tokyo (JP)

(73) Assignee: HOCHIKI CORPORATION, Tokyo (JP)

( * ) Notice: Subject to any disclaimer, the term of this patent is extended or adjusted under 35 U.S.C. 154(b) by 0 days.

(21) Appl. No.: 16/411,665

(22) Filed: May 14, 2019

(65) Prior Publication Data

US 2019/0279478 A1    Sep. 12, 2019

Related U.S. Application Data

(63) Continuation of application No. PCT/JP2017/045036, filed on Dec. 15, 2017.

(30) Foreign Application Priority Data

Dec. 21, 2016  (JP) ................................ 2016-247407

(51) Int. Cl.
*G08B 17/12* (2006.01)
*G06N 3/04* (2006.01)
(Continued)

(52) U.S. Cl.
CPC ......... *G08B 17/125* (2013.01); *G06N 3/0454* (2013.01); *G06T 7/00* (2013.01); (Continued)

(58) Field of Classification Search
CPC ...... G08B 17/125; G08B 17/00; G08B 17/06; G08B 17/10; G08B 21/00; G08B 25/00; (Continued)

(56) References Cited

U.S. PATENT DOCUMENTS 5,619,619 A * 4/1997 Shinohara ............... G06F 3/011
706/28
5,832,187 A * 11/1998 Pedersen ................ G06Q 10/06
706/45
(Continued)

FOREIGN PATENT DOCUMENTS

EP    2 178 056      4/2010
JP    06-325270     11/1994
(Continued)

OTHER PUBLICATIONS

International Search Report dated Jan. 23, 2018 in International (PCT) Application No. PCT/JP2017/045036.
(Continued)

*Primary Examiner* — Kerri L McNally
*Assistant Examiner* — Thang D Tran
(74) *Attorney, Agent, or Firm* — Wenderoth, Lind & Ponack, L.L.P.

(57) ABSTRACT

A monitor image in a monitor region captured by a monitor camera is divided into a plurality of block images, which are inputted to a fire detector constituted by a multi-layer-type neural network so as to detect a fire. A learning image generation device divides a learning image in which a fire in the monitor region is captured into a plurality of block images and classifies the images to fire learning block images, normal learning block images, or non-learning block images based upon the presence/absence of flames and smoke and the ratio at which the flames and smoke occupy in each block image so as to be stored, and a learning control part inputs the fire learning block images and the normal learning block images stored in the learning image generation device to the fire detector so as to subject a multi-layer-type neural network to learning by deep learning process.

8 Claims, 9 Drawing Sheets

(51) Int. Cl.
*G08B 17/06* (2006.01)
*G08B 21/00* (2006.01)
*G08B 31/00* (2006.01)
*G06T 7/254* (2017.01)
*G08B 25/00* (2006.01)
*G08B 17/10* (2006.01)
*G08B 17/00* (2006.01)
*G06T 7/00* (2017.01)

(52) U.S. Cl.
CPC .............. *G06T 7/254* (2017.01); *G08B 17/00* (2013.01); *G08B 17/06* (2013.01); *G08B 17/10* (2013.01); *G08B 21/00* (2013.01); *G08B 25/00* (2013.01); *G08B 31/00* (2013.01)

(58) Field of Classification Search
CPC ........... G08B 31/00; G06T 7/254; G06T 7/00; G06N 3/0454
USPC .......................................................... 340/577
See application file for complete search history.

(56) References Cited

U.S. PATENT DOCUMENTS

| | | | | |
|---|---|---|---|---|
| 5,937,077 A * | 8/1999 | Chan | .................... | G08B 17/125 250/339.15 |
| 6,035,057 A * | 3/2000 | Hoffman | .................... | G01S 7/12 382/159 |
| 7,876,229 B2 * | 1/2011 | Rao | ...................... | G06K 9/4652 340/577 |
| 7,969,296 B1 * | 6/2011 | Stell | ....................... | G08B 17/10 340/522 |
| 9,818,277 B1 * | 11/2017 | Solh | ................... | G06K 9/00711 |
| 2002/0029129 A1 * | 3/2002 | Satoh | ..................... | G06T 19/00 702/182 |
| 2003/0025599 A1 * | 2/2003 | Monroe | ........... | G08B 13/19602 340/531 |
| 2003/0044042 A1 * | 3/2003 | King | ..................... | G08B 17/125 382/100 |
| 2004/0140924 A1 * | 7/2004 | Keller | ................. | G01N 21/3581 342/22 |
| 2005/0069207 A1 * | 3/2005 | Zakrzewski | ....... | B64D 45/0015 382/190 |
| 2005/0185835 A1 * | 8/2005 | Matsugu | .............. | G06K 9/4619 382/159 |
| 2007/0250461 A1 * | 10/2007 | Sabe | ...................... | G06N 3/088 706/12 |
| 2007/0276776 A1 * | 11/2007 | Sagher | ................. | G06K 9/6254 706/25 |
| 2009/0016609 A1 * | 1/2009 | Zakrzewski | .......... | G08B 17/125 382/190 |
| 2009/0033745 A1 * | 2/2009 | Yeredor | ........... | G08B 13/19682 348/152 |
| 2009/0040367 A1 * | 2/2009 | Zakrzewski | ........... | G06K 9/629 348/370 |
| 2009/0326383 A1 * | 12/2009 | Barnes | ................. | A61B 5/0059 600/476 |
| 2010/0034420 A1 * | 2/2010 | Xiong | ................... | G06K 9/00771 382/100 |
| 2010/0073477 A1 * | 3/2010 | Finn | ..................... | G06K 9/0063 348/143 |
| 2011/0064264 A1 * | 3/2011 | Caballero | .......... | G06K 9/00771 382/100 |
| 2012/0195462 A1 * | 8/2012 | Pu | ......................... | G08B 17/125 382/103 |
| 2014/0003708 A1 * | 1/2014 | Datta | .................... | G06K 9/6256 382/159 |
| 2014/0201126 A1 * | 7/2014 | Zadeh | .................. | A61B 5/4803 706/52 |
| 2015/0213621 A1 * | 7/2015 | Buemi | ...................... | G06T 7/90 382/165 |
| 2016/0232425 A1 * | 8/2016 | Huang | .................. | G06K 9/628 |
| 2017/0046596 A1 * | 2/2017 | Bobbitt | .............. | G06K 9/00771 |
| 2017/0083762 A1 * | 3/2017 | Segalovitz | ........... | G06K 9/4628 |
| 2019/0012774 A1 * | 1/2019 | Arai | ....................... | G06K 9/627 |

FOREIGN PATENT DOCUMENTS

| | | |
|---|---|---|
| JP | 07-245757 | 9/1995 |
| JP | 2008-46916 | 2/2008 |
| JP | 2010-97412 | 4/2010 |
| JP | 2010-238028 | 10/2010 |
| JP | 2014-136895 | 7/2014 |
| JP | 2014-229035 | 12/2014 |

OTHER PUBLICATIONS

Extended European Search Report dated Jul. 2, 2020 in European Patent Application No. 17884017.9.

* cited by examiner

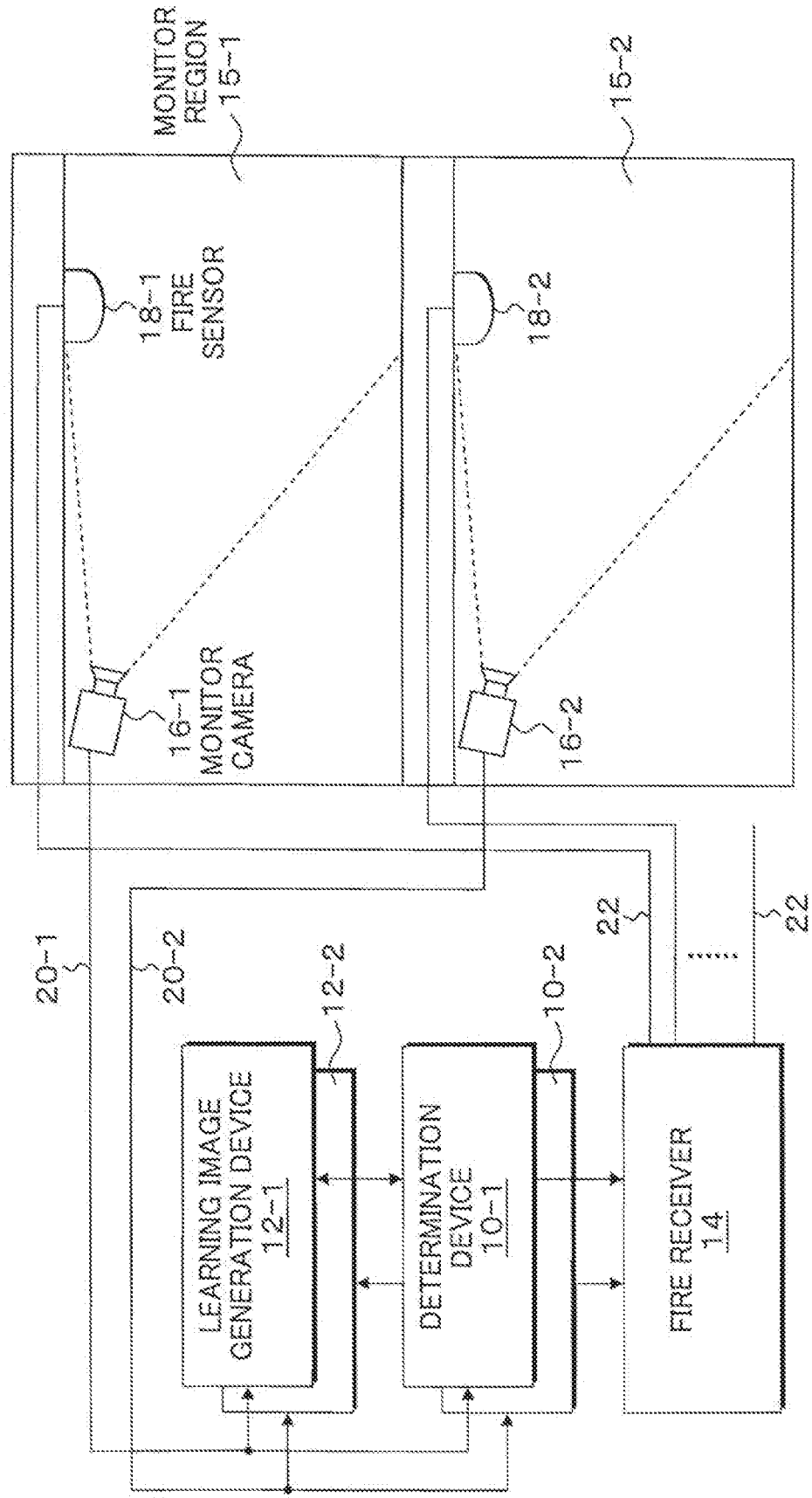

[FIG. 2]
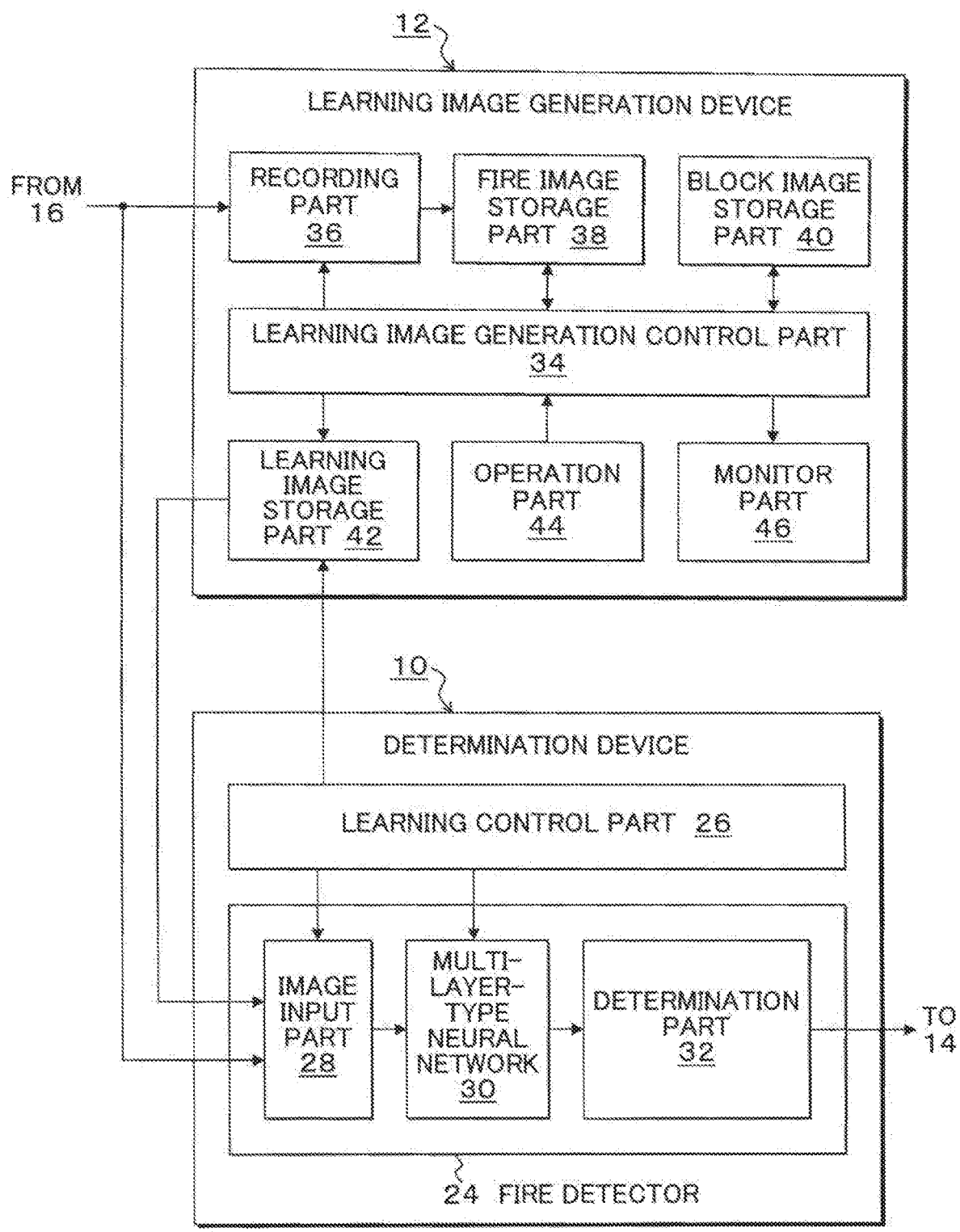

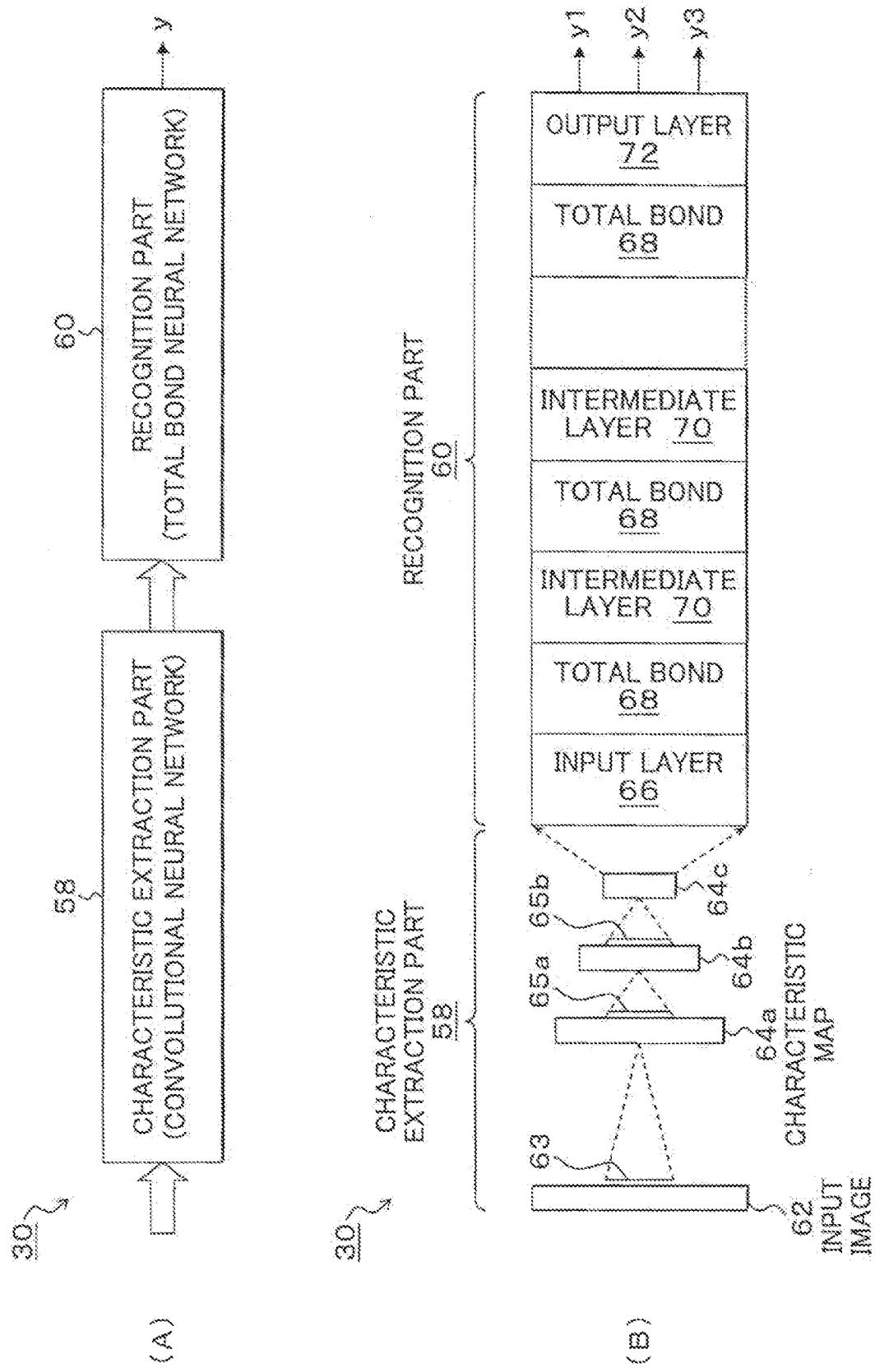

[FIG. 4]
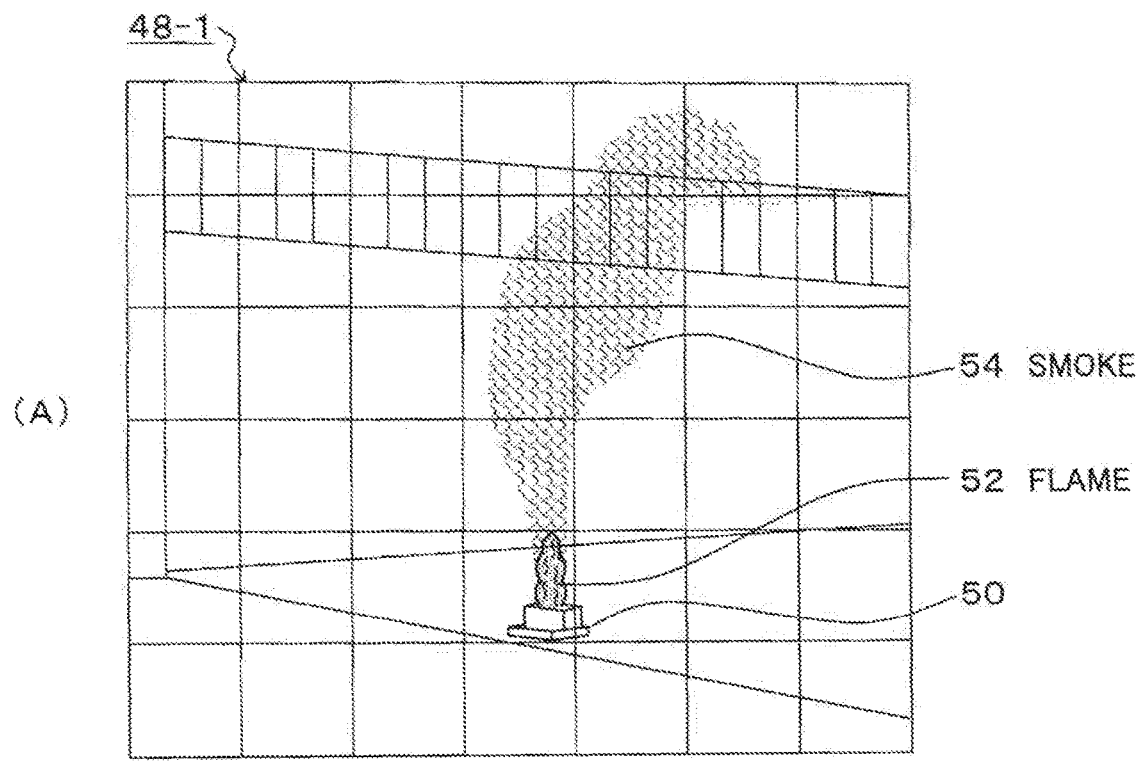
(A)
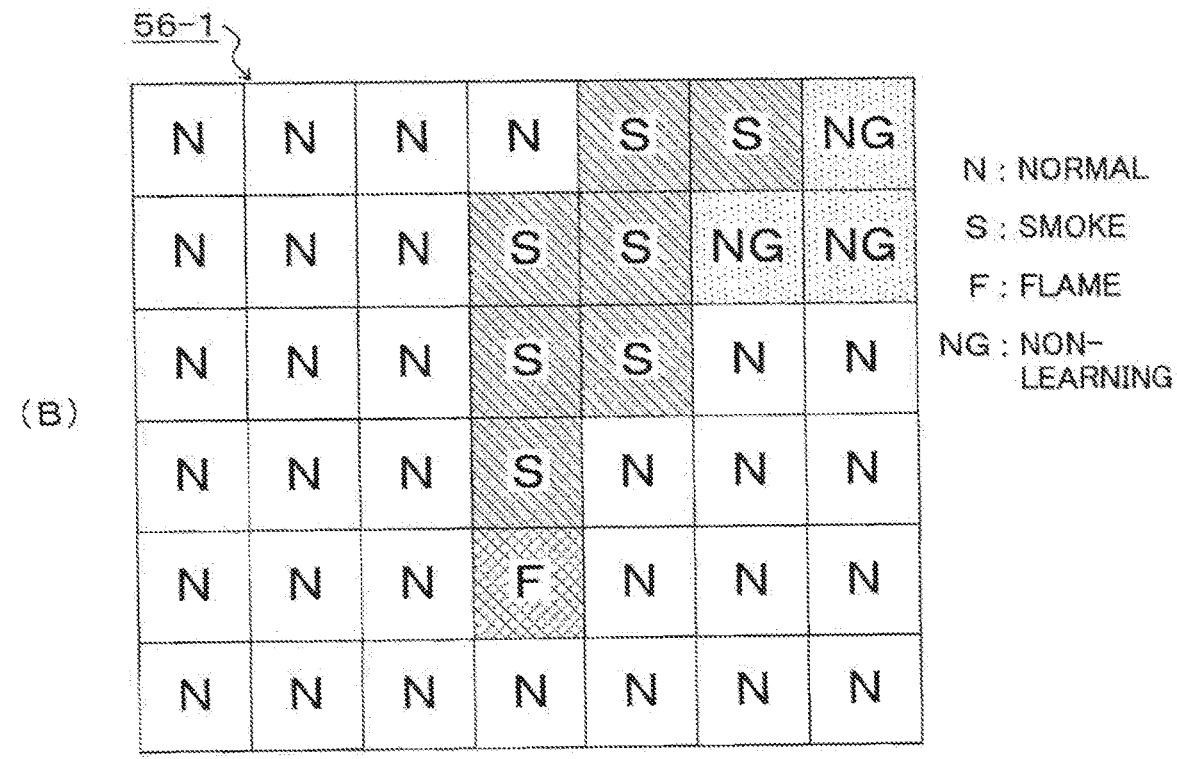
(B)
N : NORMAL
S : SMOKE
F : FLAME
NG : NON-LEARNING

[FIG. 5]
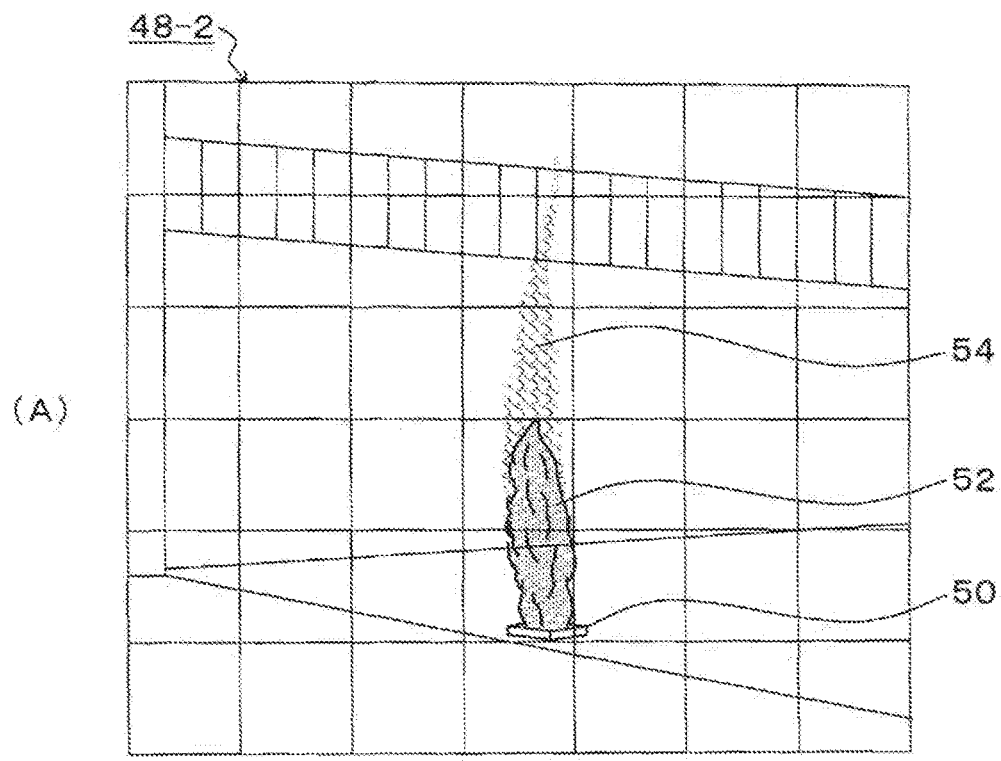

[FIG. 6]
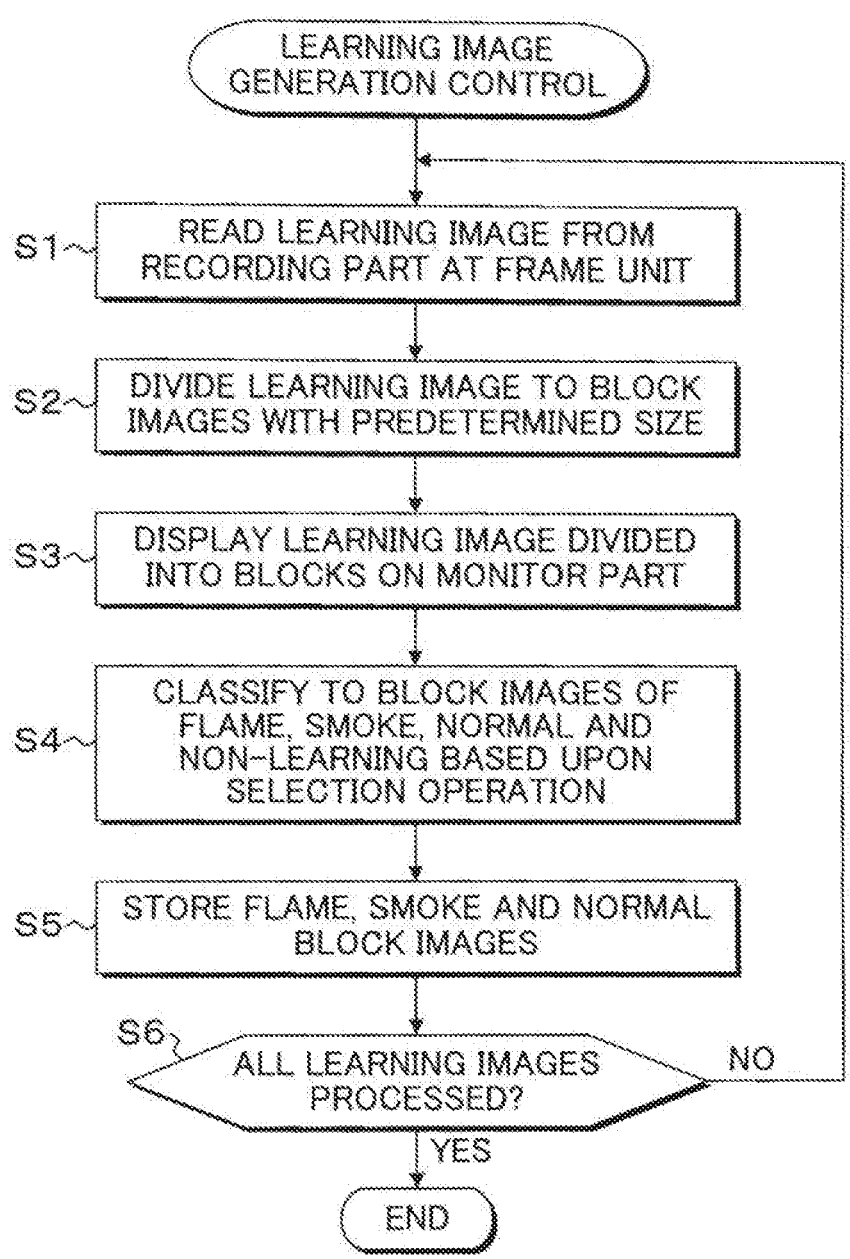

[FIG. 7]
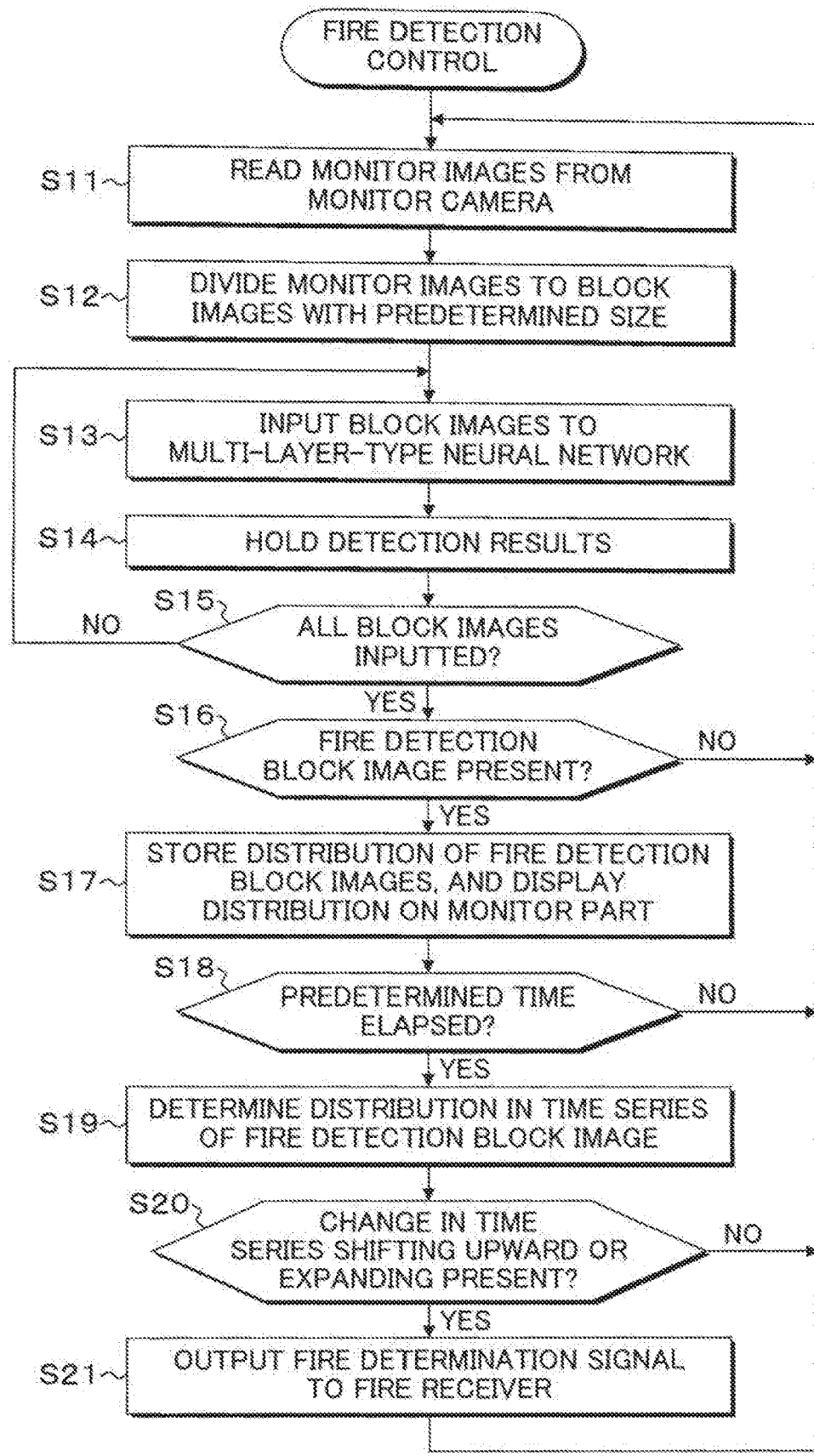

[FIG. 8]
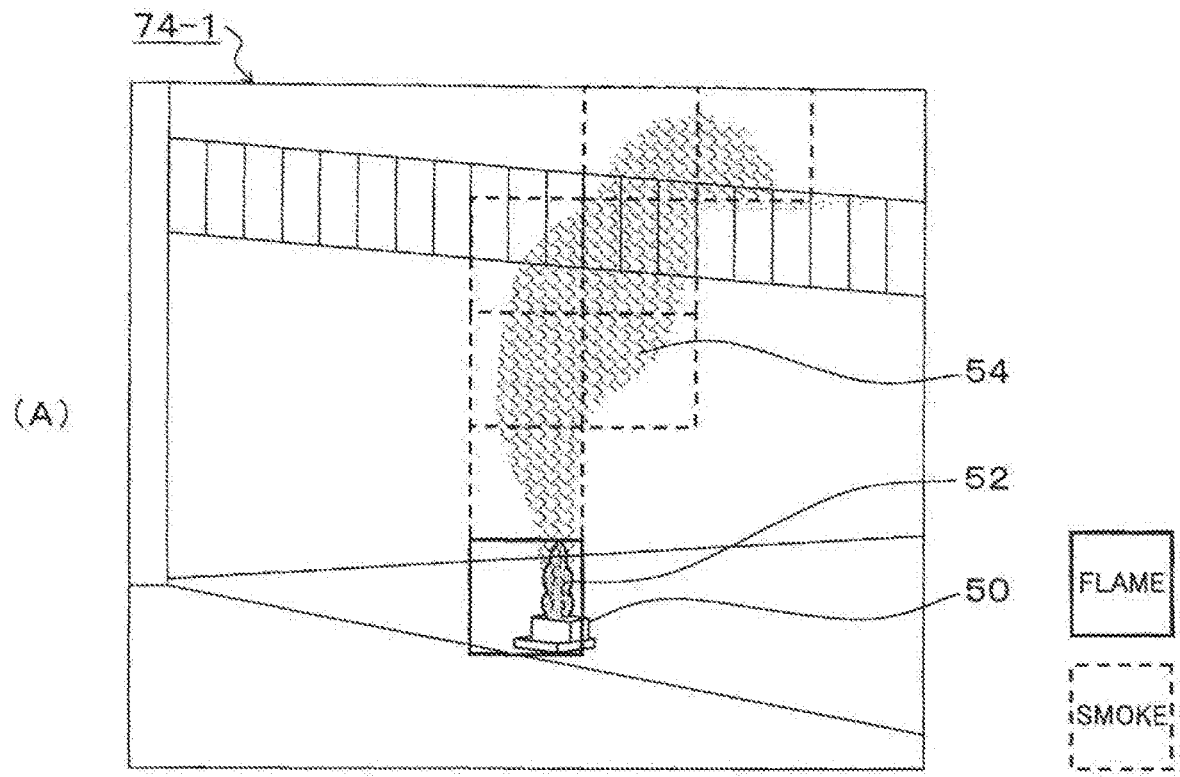
(A)
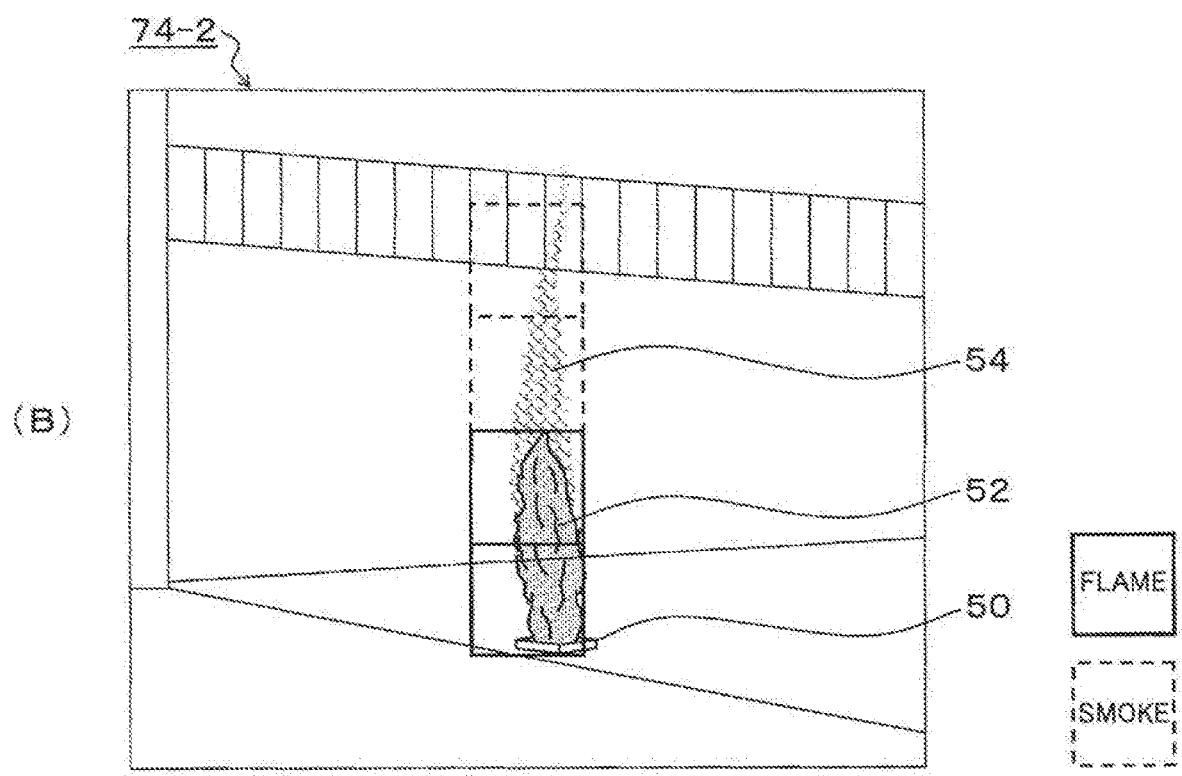
(B)

[FIG. 9]
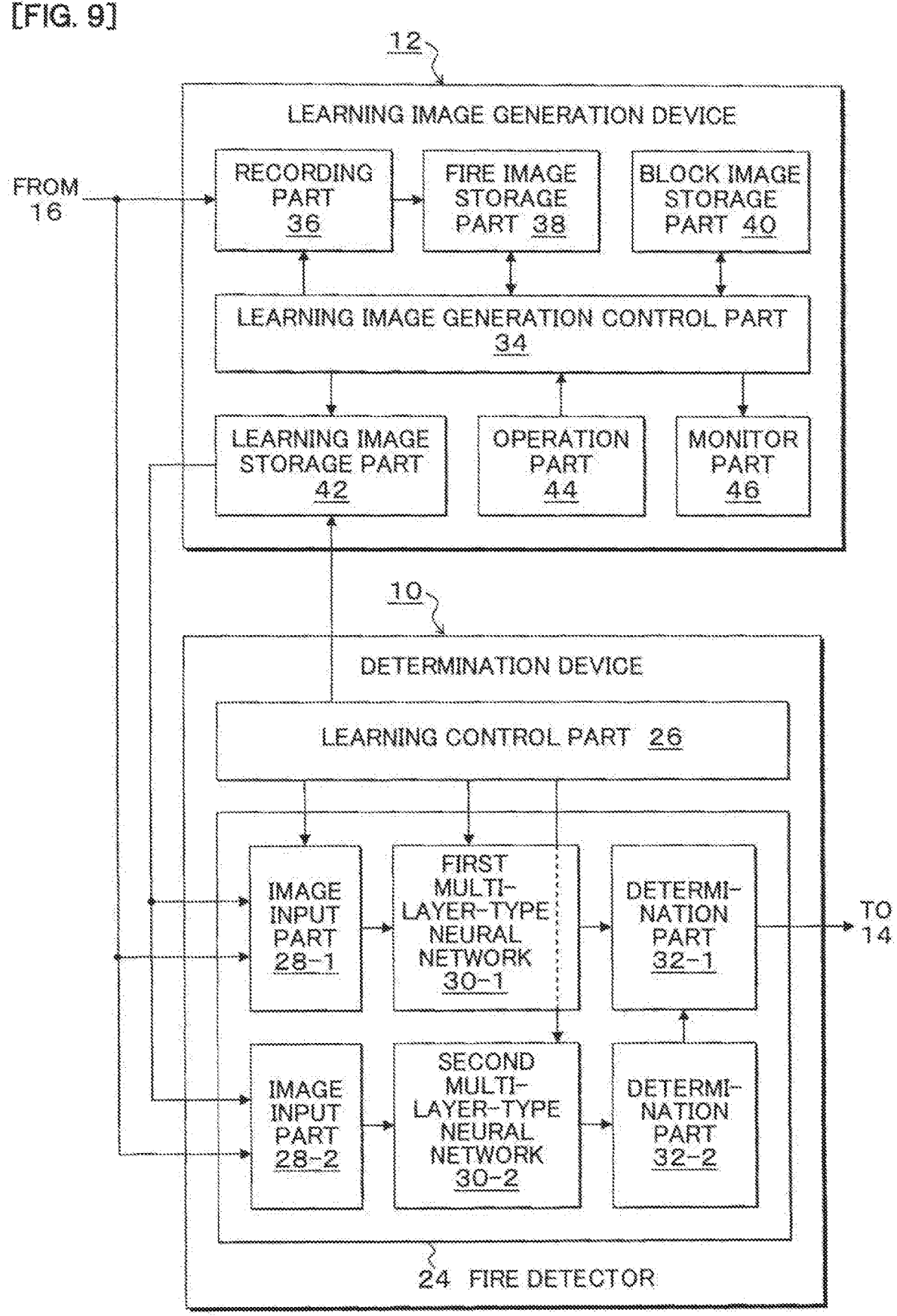

FIRE MONITORING SYSTEM

TECHNICAL FIELD

The present invention relates to a fire monitoring system which, based upon an image in a monitor region captured by a monitor camera, determines a fire by using a neural network, and raises warning.

BACKGROUND ART

Conventionally, a system has been put into practical use in which by using a sensor for monitoring a specific physical amount, such as a smoke detector, a heat detector, or the like, a fire is detected.

On the other hand, conventionally, various devices and systems have been proposed in which by performing an imaging process on an image in a monitor region captured by a monitor camera, a fire detection is carried out.

In these fire monitoring systems, an early detection of a fire is important from viewpoints of an initial extinguish for an outbreak of fire and evacuation guidance.

For this reason, in a conventional device (Patent Literature 1), reduction in transmittance or contrast, convergence of luminance to a specific value, reduction in luminance dispersion due to a narrowed luminance distribution range, changes in the average value of luminance due to smoke, reduction in the total amount of edges and an intensity increase of a low frequency band are induced as phenomena in images caused by smoke with a outbreak of fire, and by judging these factors systematically, detection of smoke can be carried out.

RELATED ART DOCUMENTS

Patent Documents

Patent document 1: JP-A No. 2008-046916
Patent document 2: JP-A No. 7-245757
Patent document 3: JP-A No. 2010-238028
Patent document 4: JP-A No. 6-325270

DISCLOSURE OF INVENTION

Problems to be Solved by the Invention

However, in the case of a fire detection system using a sensor for monitoring a specific physical amount, even when a monitoring criteria is satisfied by a phenomenon not caused by a fire, the phenomenon is recognized as an outbreak of a fire, causing a problem in which fire detection cannot be carried out correctly.

Moreover, in the case of the conventional fire monitoring system for detecting a fire from an image of smoke caused by the fire, characteristic amounts, such as transmittance, contrast, edge or the like in the image of the smoke, have to be preliminarily determined and by processing the image captured by a monitor camera, characteristics caused by the smoke have to be generated; however, there are various kinds in various states of occurrence circumstances of smoke due to a fire and it is extremely difficult to find out what characteristics exist as smoke among those circumstances, and since a decisive characteristic is hardly found out, such a fire monitoring system as to output fire warning by determining smoke due to a fire from a monitored image with high precision has not yet been put into practical use.

On the other hand, in recent years, for example, a technology has been proposed in which labels are put onto a large number of images of cats and dogs, and these are learned by a multi-layer-type neural network with a convolutional neural network so that a so-called deep learning process is carried out, and a new image is presented to the multi-layer-type neural network that has been subjected to the learning so as to determine whether it is a cat or a dog.

Moreover, it has been examined that the deep learning is not only applied to an image analysis, but also applied to a natural language processing, an action analysis or the like.

In the case when such a multi-layer-type neural network is installed in a determination device for determining a fire by inputting an image in a monitor region captured by a monitor camera so as to determine a fire, and at learning time, a large number of images at the time of a fire as well as at the time of non-fire are prepared so as to subject the multi-layer-type neural network to learning, and at the time of monitoring, by inputting an image in the monitor region captured by the monitor camera into the multi-layer-type neural network that has been subjected to the learning process, it becomes possible to configure a fire monitoring system that can estimate whether a fire occurs or not from its output with high precision and allows warning to be outputted.

In this case, in a manufacturing stage of the fire monitoring system, a learning process of the multi-layer-type neural network is carried out by using a large number of images at the time of a fire as well as at the time of a non-fire state preliminarily prepared as supervised learning images, and a determination device provided with the multi-layer-type neural network that has been subjected to the learning process is installed in a facility to be monitored, and by inputting an image captured by a monitor camera installed in a monitor region into the determination device, a fire monitoring process can be carried out.

However, among images in the monitor region captured by the monitor camera, a characteristic portion caused by a fire, such as flames and smoke caused by the fire, is limited only to a narrow region, with the result that even when the neural network of the multi-layer-type is learned as the entire image and an image in the monitor region is inputted after the learning, a problem is raised in that since the characteristic portion due to the fire is limited only to a narrow region, the determination precision of a fire is lowered.

The object of the present invention is to provide a fire monitoring system and a fire monitoring method in which, even when the characteristic portion caused by a fire occupied in the entire image is limited to a narrow range, by subjecting the multi-layer neural network to learning efficiently, the detection precision of a fire can be improved.

MEANS TO SOLVE THE PROBLEMS

Fire Monitoring System

The present invention relates to a fire monitoring system, and is characterized in that a monitored image in a monitor region captured by an image-capturing part is divided into a plurality of block images and by inputting the block images to a fire detector constituted by a multi-layer-type neural network so as to detect a fire.

Learning by Block Images

The fire monitoring system is further provided with a learning image generation part which divides an input image into a plurality of block images as learning images, and classifies the images as afire learning block image, a normal learning block image or a non-learning block image so as to be stored in a learning image storage part, and a learning control part which inputs a fire learning block image and a normal learning block image stored in the learning image storage part into a fire detector so as to subject the multi-layer-type neural network to learning.

Learning by Assumption of Block Image

By inputting divided block images to the multi-layer-type neural network, the kind of the block images is determined, and based upon the results of determination, the block images are classified and stored in the learning image storage part.

Fire Determination by Change in Time Series of Fire Detection Block

The fire detector determines an outbreak of fire in the case when the distribution of block images from which a fire is detected is shifted upward or expanded with the lapse of time.

Fire Determination by Lump of Fire Detection Blocks

The fire detector determines an outbreak of fire based upon the state of aggregation of block images from which a fire is detected.

Distribution Display of Block Images From Which Fire is Detected

The fire detector screen-displays the distribution of block images from which a fire is detected on a monitor part.

Detection of Smoke Block and Flame Block

The fire detector is provided with a first multi-layer-type neural network to which block images are inputted so as to detect flames of a fire and a second multi-layer-type neural network to which block images are inputted so as to detect smoke of a fire and is further provided with a learning image generation part which divides the input images into a plurality of block images as learning images, and classifies the respective input images into aflame learning block image, a smoke learning block image, a normal learning block image or a non-learning block image based upon the presence/absence of a flame and smoke as well as the ratio at which flames and smoke occupy in each of the block images, and stores these block images in a learning image storage part and a learning control part which inputs the flame learning block images and normal learning block images stored in the learning image storage part into the first multi-layer-type neural network so as to be learned, and also inputs the smoke learning block images and the normal learning block images stored in the learning image storage part into the second multi-layer-type neural network so as to be learned.

Distribution Display of Block Images From Which Flames and Smoke are Detected The fire detector screen-displays the distribution of block images from which flames and smoke are detected on a monitor part.

EFFECTS OF THE INVENTION

Basic Effects

The present invention, which relates to a fire monitoring system, divides a monitor image in a monitor region captured by an image-capturing part into a plurality of block images and inputs the block images to a fire detector constituted by a multi-layer-type neural network so as to detect a fire; therefore, even in the case when a characteristic portion such as flames, smoke or the like by a fire occupied in the entire image of the monitor region is limited to a narrow range, by dividing the monitor image into a plurality of block images, the characteristic portion due to the fire occupied in the entire image of the block images covers a wider range so that when the block images are inputted to a multi-layer-type neural network, the fire is estimated with high accuracy from the block images, thereby making it possible to give warning.

Effects by Learning by Using Block Images

The fire monitoring system is further provided with a learning image generation part which divides the input images into a plurality of block images as learning images, and classifies the respective block images into a fire learning block image, a normal learning block image or a non-learning block image based upon the presence/absence of a flame and smoke as well as the ratio at which flames and smoke occupy in each of the block images, and stores these block images in a learning image storage part and a learning control part which inputs the fire learning block images and normal learning block images stored in the learning image storage part into the fire detector so as to subject the multi-layer-type neural network to learning, and also inputs the smoke learning block images and the normal learning block images stored in the learning image storage unit into the multi-layer-type neural network so as to be learned; therefore, for example, an image at the time of a fire captured by the monitor camera in a fire experiment is divided into a plurality of block images as learning images, and classifying processes are carried out in which the block images having none of flames and smoke are set to be normal block images, the block images in which flames and smoke are visually observed and which occupy most of the images are set to be fire block images, and the block images which include smoke and flames that are hardly visually observed but are normal as a whole are set to be non-learning block images, and the resulting images are stored, and by inputting the stored fire block images and normal block images to the multi-layer-type neural network of the fire detector so as to be learned, the characteristic portion caused by a fire occupied in the entire learning block images can be made a wider range so that in the case when the image in the monitoring range is divided into block images and inputted, a fire can be detected with high accuracy, and an erroneous detection caused by a non-fire reason can be prevented and consequently it becomes possible to improve the detection accuracy of a fire.

Effects by Flame Learning Block Image and Smoke Learning Block Image

Moreover, the fire learning block images are made to include a flame learning block image having a ratio at which flames caused by a fire occupy is set to a predetermined ratio or more and a smoke learning block image having a ratio at which smoke caused by a fire occupies is set to a predetermined ratio or more; therefore, with respect to the block images divided from the fire learning image, those block images in which flames and smoke forming a characteristic portion of a fire are positively visually viewed can be classified as fire learning images so that by using the block images having a characteristic portion of a fire, it is possible to provide a learning process by which the estimation accuracy of a fire of the multi-layer-type neural network can be improved.

Effects of Learning by Estimation of Block Images

By inputting the divided block images to the multi-layer-type neural network, the kind of the block images is determined, and by classifying the block images by using the determination result, the resulting block images are stored in the learning image storage part; therefore, for example, in the case when the kinds of block images are manually set by each divided block image, the setting person can carry out the setting only by carrying out a confirming process.

Moreover, a block distribution is outputted in a manner so as to be overlapped with an input image, and the setting person can set the kind of a block image only by setting the non-learning block as well as by revising the detection result of a block image, so that workability can be improved.

Moreover, the determination accuracy of the multi-layer-type neural network can be confirmed at the current time. Furthermore, the workability can be improved as the determination accuracy of the multi-layer-type neural network is improved.

Effects by Fire Determination by Change in Time Series of Fire Detection Block

Moreover, since the fire detector is designed so that in the case when the distribution of block images from which a fire is detected is shifted upward or expanded with the lapse of time, the determination is made as outbreak of fire, in addition to the fire determination by block images by using the multi-layer-type neural network, by capturing time-based movements of flames and smoke peculiar to a fire based upon a change in the distribution in time series of block images from which a fire is detected, the determination accuracy of a fire can be further improved. Moreover, even if a fire in block images is determined by the multi-layer-type neural network, in the case when this is caused by a non-fire reason such as flames, smoke or the like due to cooking, the distribution of the block images from which a fire is detected is not expanded greatly with the lapse of time, and remains within a predetermined range so that it becomes possible to positively prevent erroneous warning caused by non-fire reason.

Fire Determination by Change in Time Series of Fire Detection Block

By capturing time-based movements of flames and smoke peculiar to a fire based upon a change in the distribution in time series of block images from which a fire is detected, the determination accuracy of a fire can be further improved. Moreover, even if a fire in block images is determined by the multi-layer-type neural network, in the case when this is caused by a non-fire reason such as flames, smoke or the like due to cooking, the distribution of the block images from which a fire is detected is not expanded greatly with the lapse of time, and remains within a predetermined range; therefore, it becomes possible to positively prevent erroneous warning caused by non-fire reason.

Fire Determination by Lump of Fire Detection Blocks

Since the fire detector determines an outbreak of fire based upon the state of aggregation of block images from which a fire is detected, in addition to the fire determination by block images by using the multi-layer-type neural network, by capturing the growing state of flames and smoke peculiar to a fire, the determination accuracy of a fire can be further improved.

Moreover, even if a fire in block images is determined by the multi-layer-type neural network, in the case when this is caused by an erroneous detection due to illumination or the like, the lump of the block images from which a fire is detected is not expanded greatly with the lapse of time, and remains within a predetermined range; therefore, it becomes possible to positively prevent erroneous warning caused by non-fire reason.

Effects by Distribution Display of Block Images From Which a Fire is Detected

Moreover, the fire detector is designed so that the distribution of block images from which a fire is detected is screen-displayed on a monitor part; therefore, with respect to block images formed by dividing the monitor image, the distributions of fire and normal block images are displayed, for example, on a monitor screen of a disaster prevention center so that states of flames and smoke caused by a fire can be visually confirmed in cooperation with a monitor image, thereby making it possible to carry out appropriate countermeasures such as initial extinguish, evacuation guidance or the like.

Moreover, by displaying the distributions of fire and normal block images so as to be overlapped with the monitor image displayed, for example, on the monitor screen of the disaster prevention center, it is possible to more easily visually confirm the fire state in cooperation with the monitor image.

In particular, in the case when a firing point in the monitor region is behind something, only smoke exists as an object to be confirmed when the distribution display of block images is not carried out, with the result that erroneous information might be given by failing to detect smoke. By carrying out the distribution display of block images, the state of smoke can be positively confirmed, and by further following the blocks, the generation of smoke from behind another object can be estimated so that the fire state can be more easily recognized.

Effects by Detection of Smoke Blocks and Flame Blocks

Moreover, the fire detector is provided with a first multi-layer-type neural network to which block images are inputted so as to detect flames of a fire and a second multi-layer-type neural network to which block images are inputted so as to detect smoke of the fire, and is further provided with a learning image generation part which divides an input image into a plurality of block images as learning images, and classifies the block images into a flame learning block image, a smoke learning block image, a normal learning block image or a non-learning block image depending on the presence/absence of flames and smoke and the ratio at which the flames and smoke occupy in each block image so as to be stored in a learning image storage part, and a learning control part which inputs a flame learning block image and a normal learning block image stored in the learning image storage part into a first multi-layer-type neural network so as to be learned, and inputs a smoke learning block image and a normal learning block image stored in the learning image storage part into a second multi-layer-type neural network so as to be learned, is provided; therefore, by generating the flame learning block image and the smoke learning block image and by inputting these images respectively to the respectively different first multi-layer-type neural network and second multi-layer-type neural network so as to be learned, with respect to the input of the block images formed by dividing the monitor image, the first neural network detects the presence/absence of flames in the block images with high accuracy and the second multi-layer-type neural network detects smoke in the block images with high accuracy, and by combining the two networks with each other, the fire determination can be carried out with higher accuracy.

Effects of Distribution Display of Block Images From Which Flames and Smoke are Detected Moreover, the fire detector is designed to screen-display the distribution of block images from which flames and smoke are detected on a monitor part; therefore, by displaying the distributions of flames, smoke and normal blocks, so as to be overlapped with, for example, a monitor image displayed on the monitor screen of a disaster prevention center, the states of flames and smoke caused by a fire can be further visually confirmed in cooperation with the monitor image.

BRIEF DESCRIPTION OF THE DRAWINGS

FIG. 1 is an explanatory view that schematically shows a fire monitoring system for monitoring a fire by a monitor camera.

FIG. 2 is an explanatory view that schematically shows a functional configuration of a determination device in which a learning image generation device for generating a learning block image from an image at the time of a fire captured by the monitor camera and a multi-layer-type neural network for estimating a fire from block images in the monitor region are used.

FIG. 3 is an explanatory view showing a functional configuration of the multi-layer-type neural network shown in FIG. 2.

FIG. 4 is an explanatory view that shows block divisions of a learning image captured in a fire experiment in a monitor region and classification of flame, smoke, normal and non-learning block images.

FIG. 5 is an explanatory view that shows block divisions of a learning image captured in a fire experiment in a monitor region and classification of flames, smoke, normal and non-learning of block images after a lapse of time of FIG. 4.

FIG. 6 is a flow chart showing a learning image generation control by a learning image generation device of FIG. 2.

FIG. 7 is a flow chart showing a fire detection control by a determination device of FIG. 2.

FIG. 8 is an explanatory view showing one example of a monitor screen in which the distribution of the fire detection blocks is displayed so as to be overlapped with a monitor image.

FIG. 9 is a block diagram that shows a functional configuration of the determination device in which flame detecting and smoke detecting multi-layer-type neural networks are formed, together with a learning image generation device.

BEST MODE FOR CARRYING OUT THE INVENTION

Outline of Fire Monitoring System

FIG. 1 is an explanatory view that schematically shows a fire monitoring system for monitoring a fire by using a monitor camera.

As shown in FIG. 1, monitor regions 15-1 and 15-2 in a facility such as a building or the like are respectively provided with monitor cameras 16-1 and 16-2 functioning as image-capturing means, and the monitor region 15-1 is motion-image captured by the monitor camera 16-1 and the monitor region 15-2 is motion-image captured by the monitor camera 16-2.

When not specifically distinguished, the monitor regions 15-1 and 15-2 are described as monitor regions 15, and when not specifically distinguished, the monitor cameras 16-1 and 16-2 are described as monitor cameras 16.

The monitor camera 16 image captures a color image of RGB at, for example, 30 frames/second and outputs them as motion images. Moreover, 1 frame has, for example, a pixel arrangement of 3840×2160 pixels in longitudinal and lateral directions.

Moreover, in the monitor regions 15-1 and 15-2, on/off type fire sensors 18-1 and 18-2 are installed and when the temperature or smoke concentration due to a fire is detected and the value exceeds a predetermined threshold level, a warning is given, thereby outputting a fire warning signal. When not specifically distinguished, the fire sensors 18-1 and 18-2 are described as fire sensors 18.

With respect to the monitor regions 15-1 and 15-2, determination devices 10-1 and 10-2 and learning image generation devices 12-1 and 12-2 corresponding to the monitor cameras 16-1 and 16-2 are installed in a disaster prevention monitoring center, a manager room, or the like, in a facility and a fire receiver 14 for a fire warning facility is further installed therein.

When not particularly distinguished, the determination devices 10-1 and 10-2 are described as determination devices 10, and when not particularly distinguished, the learning image generation devices 12-1 and 12-2 are described as learning image generation devices 12.

To the determination device 10-1, the monitor camera 16-1 installed in the monitor region 15-1 is connected through a signal cable 20-1, and to the determination device 10-2, the monitor camera 16-2 installed in the monitor region 15-2 is connected through a signal cable 20-2 so that motion images captured by the monitor cameras 16-1 and 16-2 are respectively inputted thereto.

From the fire receiver 14, sensor lines 22 are drawn to the monitor regions 15-1 and 15-2, and the fire sensors 18-1 and 18-2 are connected to each unit of the sensor lines 22 so that fire warning signals from the fire sensors 18-1 and 18-2 are received by each unit of the sensor lines 22, thereby outputting a fire warning.

The determination device 10 is provided with a multi-layer-type neural network, and motion images sent from the monitor camera 16 are inputted to each frame unit, and the monitor image forming the inputted frame image is divided into block images of, for example, 135 blocks of 9×15 in longitudinal and lateral directions, and each of the block images is inputted to the multi-layer-type neural network so that for each block image unit, detection is made as to whether it is a fire block image or a normal block image, and based upon a change in the distribution in time series of the fire detection block image, the presence/absence of a fire is determined, and in the case when a fire is detected, a fire determination signal is outputted to the fire receiver 14 so as to output a fire sign warning or the like, indicating the fire sign.

The learning image generation device 12 has images in the monitor region 15 at the time of a fire inputted thereto as learning images, and each image is divided into, for example, block images of 135 blocks of 9×15 in longitudinal and lateral directions, and each of the block images is classified into a flame learning block image, a smoke learning block image, a normal learning block image or a non-learning block image depending on the presence/absence of flames and smoke and the ratio at which the flames and smoke occupy so as to be stored. In this case, the flame learning block image and the smoke learning block image are included in the fire learning block image.

The flame learning block image, the smoke learning block image and the normal learning block image stored in the learning image generation device are read by a learning control part installed in the determination device 10, and inputted to the multi-layer-type neural network of the determination device 10 so as to be learned by deep learning.

Determination Device and Learning Image Generation Device

FIG. 2 is an explanatory view that schematically shows a functional configuration of the determination device in which a learning image generation device for generating a learning block image from an image at the time of a fire captured by a monitor camera and a multi-layer-type neural network for estimating a fire are used.

Functional Configuration of Determination Device

As shown in FIG. 2, the determination device 10 is provided with a fire detector 24 and a learning control part 26, and the fire detector 24 is constituted by an image input part 28, a multi-layer-type neural network 30 and a determination part 32. In this case, the functions of the fire detector 24 and the learning control part 26 are realized by execution of a program by a CPU of a computer circuit corresponding to the process of the neural network.

The flame detector 24 inputs motion images in the monitor region captured by the monitor camera 16 to the image input part 28 as monitor images in a frame unit and the image is divided into, for example, block images of 135 blocks of 9×15 in longitudinal and lateral directions in the image input part 28, and each of the block images is successively inputted to the multi-layer-type neural network 30, and outputted as a flame block estimated value y1, a smoke block estimated value y2 and a normal block estimated value y3.

The determination part 32 compares the estimated value y1 to y3 of the block image outputted from the multi-layer-type neural network 30 with a predetermined threshold value so as to determine whether it is a flame block, a smoke block or a normal block, and finds out the distribution of a fire detection block including the flame blocks and the smoke blocks for the inputted monitor image unit so as to be stored, and in the case when based upon a change in time series basis in the distribution of the fire detection blocks corresponding to predetermined time, a change peculiar to a fire occurs, that is, for example, in the case when the distribution of the fire detection blocks is shifted upward or expanded with the lapse of time, this state is determined as an outbreak of fire so that a fire determination signal is outputted to the fire receiver 14 so as to output, for example, a fire sign warning.

Upon starting up the system or the like, the learning control part 26 successively reads out flame learning block images, smoke learning block images and normal learning block images preliminarily generated in the learning image generation device 12 and stored therein, and inputs these to the multi-layer-type neural network 30 through the image input part 28 as block images with supervised learning, and these images are subjected to learning processes about weighting and bias in the multi-layer-type neural network 30 by using a learning method, such as, for example, a back propagation method (error back propagation method) or the like.

By using the block images with supervised learning, when block images obtained by dividing an image in the monitor region captured by the monitor camera 16 are inputted to the multi-layer-type neural network 30 that has been subjected to the learning, estimated values y1, y2 and y3 indicating classes (types) of flame, smoke and normal are outputted.

In this case, the flame block estimated value y1, the smoke block estimated value y2 and the normal block estimated value y3 are optimally indicated in the following manner.

In the case of the flame block, (y1, y2, y3)=(1, 0, 0).
In the case of the smoke block, (y1, y2, y3)=(0, 1, 0).
In the case of the normal block, (y1, y2, y3)=(0, 0, 1).

In the case when actual block images are inputted to the multi-layer-type neural network 30, the sum total of the estimated values y1 to y3 is 1, and the respective values are set to values in a range from 0 to 1; therefore, the estimated values y1 to y3 are inputted to the determination part 32, and compared with a predetermined threshold value, for example, 0.5, and determines the flame blocks, the smoke blocks or the normal blocks having the threshold value or more so that based upon the subsequent values, as described earlier, the distribution of the fire detection blocks including the flame blocks and the smoke blocks is found during a predetermined period of time, and in the case when a change in time series of fire detection blocks peculiar to a fire is detected, this state is determined as an outbreak of fire so that a fire determination signal is outputted to the fire receiver 14 so as to allow the fire receiver 14 to output, for example, a fire sign warning.

Additionally, a monitor device is installed in the determination device 10, and in the case when a fire is determined, an image, which is in the monitor region in which the fire is determined, and is captured by the monitor camera 16, is screen-displayed, and together with this, the distribution of the fire detection blocks is displayed so as to be overlapped with the image in the monitor region; thus, a chief administrator and a person in charge of disaster prevention who has noticed the fire sign warning from the fire receiver 14 may confirm the fire. In this case, a fire decision switch is installed in the operation part of the determination device 10, and when upon confirmation of a fire from the monitor image, the fire decision switch is operated, a fire information signal is outputted, in the same manner as in the case of the operation of a transmitter to the fire receiver 14, so that the fire receiver 14 may be allowed to output a fire warning.

Multi-Layer-Type Neural Network

FIG. 3 is an explanatory view that shows a functional configuration of a multi-layer-type neural network shown in FIG. 2, and FIG. 3(A) shows an outline thereof and FIG. 3(B) schematically shows a detailed configuration thereof.

As shown in FIG. 3(A), the multi-layer-type neural network 30 of the present embodiment is constituted by a character extraction part 58 and a recognition part 60. The character extraction part 58 is a convolutional neural network, and the recognition part 60 is a total bond neutral network.

The multi-layer-type neural network 30 corresponds to a neural network that carries out a deep learning process (Deep Learning) and corresponds to a neural network having a deep hierarchy in which a plurality of intermediate layers are bonded to one another so that an expression learning corresponding to character extraction is carried out.

The normal neural network requires manual work based upon tries and errors as character extraction for estimating a fire from images; however, the multi-layer-type neural network 30 uses a convolutional neural network as the character extraction part 58 so that an optimal characteristic is extracted by learning, with pixel values of images being used as inputs, and by inputting this to the total bond neural network of the recognition part 60, estimation as to a fire or a non-fire state is carried out.

As schematically shown in FIG. 3(B), the total bond neural network of the recognition part is constituted by repeating structures of an input layer 66, a total bond 68, an intermediate layer 70 and the total bond 68, as well as an output layer 72.

Since the total bond neural network of the recognition part 60 carries out multiple classifying processes for classifying block images into three classes of flame, smoke and normal; therefore, on the last output layer 72, three units that are the same units as those of three target classes are disposed, and inputs into these units are set to outputs y1, y2 and y3 by using a softmax function, with the sum total being 1, so that the outputs y1, y2 and y3 of the respective units indicate probabilities for belonging to the corresponding class.

Convolutional Neural Network

FIG. 3(B) schematically shows a configuration of the convolutional neural network constituting the characteristic extraction part 58.

The convolutional neural network, which has a slightly different characteristic from the normal neural network, takes a biological structure from a visual cortex. The visual cortex includes a receive cortex forming an aggregation of small cells that are sensitive to small sections of a viewing field, and behaviors of the receive cortex can be simulated by learning weighting in the form of a matrix. This matrix is referred to as weighting filter (kernel), and in the same function as the receive cortex exerts in the biological term, this is made sensitive on small sections that are similar to certain images.

The convolutional neural network can represent similarity between the weighting filter and the small section by convolutional operations, and by these convolutional operations, appropriate characteristics of the images can be extracted.

As shown in FIG. 3(B), the convolutional neural network first carries out convolutional processes on an input image 62 inputted as a block image by using a weighting filter 63. For example, the weighting filter 63 is a matrix filter subjected to a predetermined weighting process of 3×3 in longitudinal and lateral directions, and by carrying out the convolutional operations, while positioning the filter center onto each pixel of the input image 62 so that 9 pixels of the input image 62 is convoluted into one pixel of a characteristic map 64a forming a small section so that a plurality of characteristic maps 64a are generated.

Successively, a pooling operation is carried out on the characteristic maps 64a obtained from the convolutional operations. The pooling operation is a process for removing characteristic amounts unnecessary for identification, and for extracting characteristic amounts that are necessary for identification.

Successively, by repeating the convolutional operations using the weighting filters 65a and 65b and the pooling operations in multiple stages, characteristic maps 64b and 64c are obtained, and the last characteristic map 64c is inputted to an identification part 60 so that a fire or a non-fire state is estimated by the recognition part 60 using the normal total bond neural network.

Additionally, with respect to the pooling operation in the convolutional neural network, it fails to clearly indicate characteristic amounts that are unnecessary for estimating a fire or a non-fire state, and necessary characteristic amounts might be omitted; therefore, it is possible not to carry out the pooling operation.

LEARNING OF MULTI-LAYER-TYPE NEURAL NETWORK

Back Propagation

The neural network constituted by an input layer and a plurality of intermediate layers and an output layer is designed so that by installing a plurality of units on each layer so as to be bonded to a plurality of units on another layer, and by allowing each unit to select weighting and a bias value, a vector product is found between a plurality of input values and the weighting, and by adding the bias value thereto, the sum total is found, and by allowing this to be subjected to a predetermined activating function, the resulting value is outputted to the unit of the next layer such that a forward propagation in which values up to arriving at the final layer are propagated is carried out.

In an attempt to alter the weighting (weight) and bias of this neural network, a learning algorithm known as back propagation is used. In the back propagation, there are supervised learning in the case when a data set of an input value x and an expected output value (expected value) y is given to a network, and learning not supervised in which only the input value x is given to the network, and in the present embodiment, supervised learning is carried out.

In the case when the back propagation is carried out by the supervised learning, as an error caused upon comparing an estimated value y* as the result of forward propagation through the network with an expected value y, for example, a function of the mean square error is used.

In the back propagation, by using the size of an error between the estimated value y* and the expected value y, the value is propagated while correcting weighting and bias from the rear toward the front side of the network. The corrected amount on each weighting and each bias is dealt as a contribution to the error, and calculated by the most urgent lowering method, and by altering the values of weighting and bias, the value of the error function is minimized.

The sequence of processes of learning of the back propagation relative to the neural network is explained as follows.
(1) By inputting an input value x to the neural network, forward propagation is carried out to find out an estimated value y*.

(2) An error is calculated by an error function based upon the estimated value y* and the expected value y.

(3) While updating the weighting and bias, back propagation is carried out by the network.

This sequence of processes are repeatedly carried out by using the combination of the different input value x and expected value y until the error between the weight and bias of the neural network is minimized as small as possible so that the value of the error function is minimized.

In the supervised learning control of the multi-layer-type neural network 30 shown in FIG. 3(B), the above-mentioned back propagation is carried out by using the following equations:

Expected values of flame learning block image (y1, y2, y3)=(1, 0, 0).

Expected values of smoke learning block image (y1, y2, y3)=(0, 1, 0).

Expected values of normal learning block image (y1, y2, y3)=(0, 0, 1)

Additionally, in the case when back propagation is carried out by using non-supervised learning, by using the size of an error between the estimated value y* and the inputted value x, the value is propagated while correcting weighting and bias from the rear toward the front side of the network. In this case also, the corrected amount on each weighting and each bias is dealt as a contribution to the error, and calculated by the most urgent lowering method, and by altering the values of weighting and bias, the value of the error function is minimized.

Functional Configuration of Learning Image Generation Device

As shown in FIG. 2, the learning image generation device 12 is constituted by a learning image generation control part 34, a recording part 36, a fire image storage part 38, a block image storage part 40, a learning image storage part 42, an operation part 44 and a monitor part 46, and the function of the learning image generation control part 34 is realized by execution of a program by a CPU in a computer circuit. Moreover, the recording part 36, the fire image storage part 38, the block image storage part 40 and the learning image storage part 42 are classified for each function; however, as hardware, a single storage storage part is utilized.

In the recording part 36, a fire motion image obtained by capturing a fire experiment carried out in the monitor region 15 by the monitor camera 16 is recorded. The monitor camera 16 captures a color image of RGB, for example, at 30 frames/second and outputs its motion image, and this is recorded in the recording part 36 as a fire motion image. Moreover, when one frame of the fire motion image recorded in the recording part 36 is, for example, a 4 K image, a pixel arrangement of 2160×3840 in longitudinal and lateral directions is formed.

When a predetermined learning image generation operation is carried out by the operation part 44, the learning image generation control part 34 reads out a fire image from the recording part 36 as a learning image at a frame unit, and for example, in the case of a 4K image, divides the image into block images of 135 blocks of 9×15 in longitudinal and lateral directions, and stores them in the block image storage part 40 and also screen-displays them on the monitor part 46.

FIG. 4 is an explanatory view that shows block divisions of a learning image captured in a fire experiment or the like in a monitor region and classifications of flames, smoke, normal and non-learning of block images.

As shown in FIG. 4(A), the monitor part 46 displays fire images 48-1 that are read from the recording part 36 and divided into blocks. In the present embodiment, for simplicity of the view, the fire images 48-1 are divided into block images of 42 blocks of 6×7 in longitudinal and lateral directions.

The fire image 48-1 shows an image in a fire initial stage in which a burning object 50 formed by stacking, for example, square timbers as a burning object is ignited and after the ignited state, flames 52 are slightly raised, with smoke 54 being raised thereover.

With respect to the fire image 48-1 divided into blocks in this manner, block images, such as normal learning block images N, smoke learning block images S, flame learning block images F and non-learning block images NG, are classified by visual determination by an operator.

At this time, the divided block images are inputted to the multi-layer-type neural network, and based upon the results thereof, by using the fire detection blocks as fire learning block images, the fire detection blocks as flame learning block images, the smoke detection blocks as smoke learning blocks and the non-fire detection blocks as normal learning blocks, the respective blocks may be displayed on the monitor part 46 so as to be overlapped with the image, with the frame color of each block being changed in accordance with the respective classifications; thus, the results thereof may be manually edited. With this arrangement, the time-consuming tasks of classifying the block images can be reduced, and the accuracy of the current fire detector can be simultaneously confirmed.

In this case, the normal learning block images N are blocks without any flame or smoke, the smoke learning block images S are blocks in which smoke is visually observed in most of the blocks, flame learning block images F are blocks in which flames are visually observed in most of the blocks, and the non-learning block images NG are almost normal blocks although there are smoke and flames that are hardly visible.

FIG. 4(B) is a block classifying image 56-1 corresponding to the flame image 48-1 of FIG. 4(A), and a block having the burning object 50 forms a flame learning block image F, and seven blocks located right above the block and diagonally right upward direction form smoke learning block images S, three blocks on the right above corner form non-learning block images NG, and blocks other than these form normal learning block images N.

Additionally, the block classifying image 56-1 shown in FIG. 4(B) is stored in a data format in which pieces of identification information indicating normal learning block images N, smoke learning block images S, flame learning block images F, or non-learning block images NG that correspond to, for example, block addresses (two dimensional addresses) A11 to A67 specified by line numbers 1 to 6 and column numbers 1 to 7, with the upper left corner being set to an initial position, are stored.

FIG. 5 is an explanatory view that shows block divisions of a learning image captured in a fire experiment in a monitor region and classification of flame, smoke, normal and non-learning block images after a lapse of time of FIG. 4.

In the fire image 48-2 divided into blocks shown in FIG. 5(A), a fire is expanded relative to FIG. 4(A) as time elapses, and flames 52 from the burning object 50 rise greatly, with smoke 54 above the flames 52 being reduced in its amount.

FIG. 5(B) is a block classifying image 56-2 in the fire image 48-2 of FIG. 5(A), and two blocks having the burning object 50 form flame learning block image F, and two blocks above the image form smoke learning block images S, and one block right above the blocks forms a non-learning block images NG, and blocks except for these form normal learning block images N.

Additionally, FIG. 4(A) and FIG. 5(A) show one example of a fire image, and actually, fire motion images are recorded in a manner so as to expand from a fire ignition of a burning object to flames rising up as shown in FIG. 5(A) through FIG. 4(A); therefore, when, for example, the recorded images for 5 minutes from the fire ignition are read in a frame unit, fire images of 9000 pieces are obtained, and by respectively dividing each image into block images of 42 blocks of 6×7 in longitudinal and lateral directions so as to be classified, normal block images N, fire learning block images F and smoke learning block images S of 378,000 pieces at most can be generated.

Actually, non-learning block images NG are assumed to be partially present, for example, at a rate of 10% or less; never the less, learning block images including normal block images N, flame learning block images F and smoke learning block images S of about 340,000 pieces are generated so that a sufficient number of learning block images for the learning of the multi-layer-type neural network 30 of the fire detector 24 can be generated.

Moreover, smoke generated by a fire is different depending on materials for a burning object to be burned. For example, when the material for a burning object is timber, cloth, paper or the like, white smoke is generated, and moreover, when the material for a burning object is a synthesized resin or oil, black smoke is generated in most cases. For this reason, upon generation of the fire learning data, fire experiments in which the material for a burning object is changed are image-captured by the monitor camera 16 and recorded, and by reading out the recorded images and dividing the image into blocks, block images are classified to form normal learning block images N, smoke learning block images S, flame learning block images F, or non-learning block images NG, and the normal learning block images N, the smoke learning block images S and the flame learning block images F are generated depending on smoke different depending on materials for a burning object, and the multi-layer-type neural network 30 of the fire detector 24 is subjected to learning.

Additionally, with respect to the classification of block images formed by dividing the fire image, in addition to the classification by the manual operation visually carried out by an operator, the classification may be carried out, for example, by finding the sum total of pixel luminance, for example, in a block unit, so as to be automatically determined.

Moreover, since the image capturing of a fire image obtained by a fire experiment is not carried out in the monitor region 15 in some cases, in this case, motion images obtained by image-capturing a fire experiment carried out by using a fire experimental facility on the system manufacturing side are utilized. Since motion images of a fire captured at a place other than the monitor region 15 has a background different from that of the monitor region 15, the flame learning block image and smoke learning block image in the block images are used as learning block images; however, the normal learning block image is excluded from the learning subject, and in place of this, the normal learning block image generated by block-dividing the image captured by the monitor camera 16 in the normal monitor state of the monitor region 15 can be used.

Learning Image Generation Control

FIG. 6 is a flow chart showing learning image generation control by a learning image generation device shown in FIG. 2, and the control is carried out by a learning image generation control part shown in FIG. 2.

As shown in FIG. 6, in the case when the learning image generation control is started by a predetermined operation, the learning image generation control part 34 reads out fire motion images captured by the monitor camera 16 on a frame-by-frame basis in step S1 and stored in the recording part 36 as a fire image, divides the image into block images having a predetermined size in step S2, and in step 3, screen-displays the block images on a monitor part 46, for example, as shown in FIG. 4(A).

Successively, the sequence proceeds to step S4, and based upon visual operations by the operator on the block images screen-displayed on the monitor part 46, the learning image generation control part 34 classifies the block images into flame learning block images, smoke learning block images, normal learning block images or non-learning block images, and of these images, stores the flame learning block images, smoke learning block images and normal learning block images in the learning image storage part 42 in step S5.

Successively, in step S6, the learning image generation control part 34 determines whether or not all the fire images have been processed, and if all the fire images have not been processed, repeats processes from step S1, while if determined that all the fire images have been processed, completes the sequence of processes, and informs the learning control part 26 of the determination device 10 of the completion of generation of learning images, thereby allowing the multi-layer-type neural network 30 to perform learning.

Fire Detection Control

FIG. 7 is a flow chart showing fire detection control by a determination device of FIG. 2, and the control is performed by a fire detector 24 of FIG. 2.

As shown in FIG. 7, in step S11, the fire detector 24 reads monitor images from the monitor camera 16 into an image input part 28, in step S12, divides the image into block images having a predetermined size, and in step S13, inputs the block images successively from the leading block image into the multi-layer-type neural network 30 so that estimated values y1, y2 and y3 outputted from the multi-layer-type neutral network 30 are compared with a predetermined threshold value in the determination part 32, with the result that if the estimated value y1 is the threshold value or more, the block is determined as the flame block, while if the estimated value y2 is the threshold value or more, the block is determined as the smoke block, while if the estimated value y3 is the threshold value or more, the block is determined as the normal block, and when determined as the flame block or the smoke block, the block is further determined as to whether or not it is the fire detection block, and in step S14, the determination results are stored.

Successively, in step S15, the fire detector 24 determines whether or not all the block images have been inputted, and when an un-input state is determined, processes from step S13 are repeated, while when the input of all the block images have been determined, the sequence proceeds to step S16, and in the case when even a single fire detection block including the flame block or the smoke block is present, the sequence proceeds to step S17 so that the distribution of the fire detection blocks is stored, and the distribution of the fire detection blocks is displayed on the monitor part 46 so as to be overlapped with the current monitor image.

FIG. 8 is an explanatory view that shows one example of a monitor screen on which the distribution of the fire detection blocks is displayed so as to be overlapped with the monitor image, and FIG. 8(A) exemplifies a fire image 48-1 shown in FIG. 4(A), while FIG. 8(B) exemplifies a fire image 48-2 shown in FIG. 5(A).

In monitor screens 74-1 and 74-2 of FIGS. 8(A) and 8(B), flame detection blocks indicated by a frame drawn by a solid line and smoke detection blocks indicated by a frame drawn by a dotted line are displayed as the fire detection blocks so as to be overlapped with a fire image in the monitor region.

Additionally, FIG. 8 shows the flame detection blocks and the smoke detection blocks in a separated manner; however, the two kinds thereof may be displayed as the same fire detection blocks. Moreover, the flame detection blocks and the smoke detection blocks or the fire detection blocks are separated from each other by different kinds of lines of the frames; however, not limited by this, these may be separated from each other by colors of the frames, or may be separated from each other by painting the blocks with a transparent color that makes the monitor image visible. Moreover, the block frame or the block color may be made flickering.

Referring again to FIG. 7, successively, the fire detector 24 returns to step S11 until the passage of predetermined time has been determined in step S18, and reads the next monitor image, and repeats processes of step S12 to S17 and allows the distribution of fire detection blocks that change in time series to be stored.

After determining an elapse of predetermined time in step S18, the fire detector 24 proceeds step S19 and determines the distribution of the fire detection blocks that change in time series and are stored by the processes of step S11 to S17, and in step S20, upon determining a change in time series in which the fire detection blocks are shifted upward with the lapse of time, or are expanded, the sequence proceeds to step S21 to determine a fire, and a fire determination signal is outputted to the fire receiver 14 so as to output, for example, a fire sign warning.

Determination Device for Detecting Flames and Smoke Individually

FIG. 9 is a block diagram that shows a functional configuration of a determination device in which flame detecting and smoke detecting multi-layer-type neural networks are formed, together with a learning image generation device.

In the determination device 10 shown in FIG. 2, a single multi-layer-type neutral network 30 is installed in the fire detector 24, and both of the flame learning block images and the smoke learning block images generated in the learning image generation device 12 are inputted to the single multi-layer-type neural network 30 as fire learning block images so as to be learned, and subsequently, it is assumed that there is a difference between the estimated value of fire due to the input of the block images in which flames occupy most of the region and the estimated value of fire due to the input of the block images in which smoke occupies most of the region, thereby causing a possibility in which the estimated accuracy of a fire of either of the two having less number of learning to be lowered.

Therefore, in the determination device 10 of FIG. 9, in order to detect flames in a fire by inputting block images thereto, the fire detector is provided with an image input part 28-1, a first multi-layer-type neural network 30-1 and a determination part 32-1 installed therein, and in order to detect smoke in a fire by inputting block images thereto, is further provided with an image input part 28-2, a second multi-layer-type neural network 30-2 and a determination part 32-2 installed therein.

The learning image generation device 12, which has the same configuration as that of the embodiment of FIG. 2, divides a fire image read out from the recording part 36 into block images with a predetermined size, and classifies the respective block images into flame learning block images, smoke learning block images, normal learning block images or non-learning block images so as to be stored, in accordance with the presence/absence of flames and smoke and ratios of flames and smoke in each of block images.

The learning control part 26 of the determination device 10 reads out the flame learning block images and the normal learning block images stored in the learning image storage part 42 of the learning image generation device 12, and inputs the images to the first multi-layer-type neural network 30-1 through the image input part 28-1 so as to be learned. For this reason, the first multi-layer-type neural network 30-1 outputs an estimated value of flames relative to the input of block images formed by dividing a monitor image.

Moreover, the learning control part 26 of the determination device 10 reads out the smoke learning block images and the normal learning block images stored in the learning image storage part 42 of the learning image generation device 12, and inputs the images to the second multi-layer-type neural network 30-2 through the image input part 28-2 so as to be learned. For this reason, the second multi-layer-type neural network 30-2 outputs an estimated value of smoke relative to the input of block images formed by dividing a monitor image.

In this manner, upon receipt of an input of block images formed by dividing the monitor image, the first multi-layer-type neural network detects the presence/absence of flames in the block images with high accuracy and the second multi-layer-type neural network detects smoke in the block images with high accuracy, and by combining the two networks with each other, the fire determination can be carried out with higher accuracy.

Moreover, the determination parts 32-1 and 32-2 determine flames in a fire and smoke in the fire by comparing the estimated value of flames and the estimated value of smoke with predetermined threshold values, and by further determining a change in series of time peculiar to the fire in the distribution of the flame detection blocks and the distribution of the smoke detection blocks, it becomes possible to determine a fire with higher accuracy and consequently to output a fire determination signal to the fire receiver 14.

Moreover, in the fire detector 24, by displaying the distributions of flame detection blocks and smoke detection blocks obtained as the detection results of the first and second multi-layer-type neural networks 30-1 and 30-2 on a monitor image of the monitor part so as to be overlapped with each other, states of flames and smoke caused by a fire can be easily confirmed visually in cooperation with the monitor image, thereby making it possible to carryout appropriate countermeasures such as initial extinguish, evacuation guidance or the like.

MODIFIED EXAMPLES OF PRESENT INVENTION

Learning and Detection of Border

In the above-mentioned embodiments, determination is made as to whether or not the block images relate to a fire; moreover, it may be designed so as to determine whether or not the block image corresponds to a border of a fire. At the time of learning, when among the blocks, there is a block in which a portion influenced by flames, smoke or the like and another portion having no influences therefrom are mixedly located, this block is stored in the learning image storage part as a fire border learning block image.

Additionally, the fire learning block images, normal learning block images and non-learning block images relating to the above-mentioned embodiment may be prepared as independent items irrespective of the distinction thereof. For example, the fire learning block image may also be prepared as the fire border learning block image.

The multi-layer-type neural network for detecting the border of a fire uses the same neural network as the multi-layer-type neural network for use in detecting a fire and may be designed to perform learning with its output terms being prepared as two, that is, a fire detection term and a fire border detection term. In this case, with respect to the non-learning image, learning based upon the fire detection term is not carried out, and only the learning for the fire border detection term is carried out.

In this manner, by using the same multi-layer-type neural network, at the time of monitoring, it becomes only necessary to carry out calculations immediately before the output layer, and a plurality of calculations of the multi-layer-type neural networks, which are required when a plurality of multi-layer-type neural networks are used, become no longer required. Moreover, as described above, the same multi-layer-type neural network is desirably used; however, the multi-layer-type neural network of different type may be used.

When a fire block and a block from which no fire is detected are located adjacent to each other, the fire detector determines whether or not the adjacent block is a fire border block. The block adjacent to the fire block is considered to be a block where the border of a fire is located, and which is highly possible to form such a block image as to form a non-fire learning block at the time of learning. With respect to such a block that is hardly determined as to whether or not it is a fire block also, determination is made as to whether it is a fire detection block or a block having no detection of a fire at the time of monitoring; however, by detecting whether or not it is a fire border block, it becomes possible to determine which block has a fire border, and consequently to more correctly determine and display the size and movements of a fire.

Relationship Between Fire Warning Facility and Monitor System

The above-mentioned embodiment has a configuration in which a fire warning facility and a monitor system function in cooperation with each other; however, only the monitor system may be used. Even in the case of a place where installation of a detector for a fire warning facility is difficult, such as an open ceiling configuration or the like, the present system may be applied.

Moreover, in the case when a fire warning facility and a monitor system are made in cooperation with each other, as to which system is used for detecting a fire, a display may be given on the display part, such as a display part of a fire receiver or a monitor of a monitor facility. Thus, the monitoring person makes it possible to distinguish a warning from a sensing device or a fire warning from a motion image monitor.

Arson Monitor

The above-mentioned embodiment has exemplified a configuration in which fire monitoring in a warning region inside a house is carried out; however, in addition to this, another configuration is proposed in which a fire detector constituted by a multi-layer-type neural network is installed in an arson monitoring system that uses an outdoor monitor camera installed therein, and by subjecting the fire detector to learning by deep learning, images captured by the monitor camera are inputted thereto so as to monitor an arson.

Moreover, the system may be designed to estimate an arsonist. The system may have a configuration in which upon detection of a human entering a region by a human detection means, such as a human detection sensor, a monitor camera or the like, a trigger is set, and when the human gets out of the region, the trigger is released. When a fire block is detected while the trigger is set, the human who entered the region is estimated as an arsonist, and the video image taken while the human was staying in the region is allowed to be read or the like.

Non-Fire Learning

In the aforementioned embodiment, learning is carried out by using images at the time of a fire; however, learning may be carried out by using images at the time of a non-fire state. When a non-fire state is erroneously detected at the time of monitoring, the image of the detected block as a fire block is stored in the learning image storage part as a non-fire learning block image.

It is desirable to install a term of non-fire determination as an output term different from the fire block and the normal block. This method is used because the non-fire block is not a fire, in the case of setting this block as the normal block, the non-fire block image has characteristics close to those of the fire block; therefore, adverse effects might be given to the determination accuracy between the normal block that is not the non-fire block and the fire block.

Fire Determination of Block Image Using Likelihood

In the aforementioned embodiments, a binarized image is used for finding out whether it is a fire block or not a fire block; however, by using likelihood of a fire, determination and display of distribution of a fire in a monitor region may be carried out. The likelihood of a fire is obtained by using an estimated value outputted by the multi-layer-type neural network for each block. The estimated value and the likelihood may be set to the same, or the estimated values may be sectioned for specific values so as to correspond to the likelihood. Moreover, the likelihood may be made to be influenced by the adjacent block, for example, by varying the likelihood based upon the average value of the likelihood of the adjacent block. With this arrangement, the possibility of erroneous detection of a fire block due to illumination or the like can be reduced, and with respect to a true fire in which normal flames and smoke tend to be easily detected in a manner so as to straddle between a plurality of blocks, the detection rate can be improved.

Clarifying Fire Determination Basis

In the aforementioned embodiment, the determination device informs of the determination result as to the presence/absence of a fire; however, in addition to this, the reason by which a fire is determined may be displayed. For example, in the case of monitoring by a camera image, an image on which a fire is determined is displayed and with respect to a block (block having a high fire estimation value) whose contribution to fire determination is high, a highlighted display is given. Thus, with respect to a block region which is determined by the fire detector as a fire, visual confirmation can be easily made, and it becomes possible to easily determine whether or not a fire actually occurs, and consequently to support determination corresponding to the circumstance.

Characteristic Extraction

In the aforementioned embodiment, by inputting images to a convolutional neural network, characteristics of a fire are extracted; however, without using the convolutional neural network, a pre-treatment may be carried out so as to extract predetermined characteristics, such as contour, graduations, or the like, from the inputted images, and by inputting the image whose characteristics are extracted to a total bond neural network that functions as a recognition part, the fire may be estimated. Thus, a processing load for characteristic extraction of images can be reduced. Moreover, although the convolutional neural network is more desirable than the total bond neural network because of its high speed learning, the total bond neural network may be used.

Concerning Learning Method

The aforementioned embodiment performs learning by back propagation; however, the learning method of the multi-layer-type neural network is not intended to be limited by this.

Infrared Ray Illumination and Image Capturing of Infrared-Ray Image

In the aforementioned embodiment, the monitor region is image-captured by a monitor camera in a state where illumination of the monitor region is used and/or in a state where natural light is used; however, by applying infrared ray to the monitor region from an infrared ray illumination device and an infrared-ray image is captured by using a monitor camera having sensitivity to the infrared-ray region, and a learning block image is generated by a learning image generation device so that by subjecting the multi-layer-type neural network of the determination device to learning by back propagation and by inputting block images formed by dividing the infrared-ray image in the monitor region to the multi-layer-type neural network that has been subjected to the learning, a fire may be determined.

In this manner, by inputting the block images obtained by dividing an infrared ray image in the monitor region into the determination device, a fire monitoring process using monitor images can be carried out without being influenced by the illumination state in the monitor region and a change in brightness in day and night, or the like.

Others

Moreover, not limited by the above-mentioned embodiment, the present invention may be modified on demand, without impairing its object and advantages, and is not intended to be limited by numeric values shown in the aforementioned embodiment.

DESCRIPTION OF REFERENCE NUMERALS 10, 10-1, 10-2: determination device
12, 12-1, 12-2: learning image generation device
14: fire receiver
15, 15-1, 15-2: monitor region
16, 16-1, 16-2: monitor camera
18, 18-1, 18-2: fire sensor
20-1, 20-2: signal cable
22: detector line
24: fire detector
26: learning control part
28: 28-1, 28-2: image input part
30: multi-layer-type neural network
30-1: first multi-layer-type neural network
30-2: second multi-layer-type neural network
32, 32-1, 32-2: determination part
34: learning image generation control part
36: recording part
38: fire image storage part
40: block image storage part
42: learning image storage part
44: operation part
46: monitor part
48-1, 48-2: fire image
50: burning object
52, 102: flames
54: smoke
55: heated air stream
56-1, 56-2: block classification image
58: character extraction part
60: recognition part
62: input image
63, 65a, 65b: weighting filter
64a, 64a, 64c: character map
66: input layer
68: total bond
70: intermediate layer
72: output layer
74-1, 74-2: monitor screen

The invention claimed is:

1. A fire monitoring system comprising:
an image capturing part for capturing a monitor image in a monitor region;
an image input part for dividing the monitor image into a plurality of block images as determining images by inputting the monitor image;
a multi-layer-type neural network for determining a flame block in which a flame is detected or a smoke block in which smoke is detected or a normal block in which neither a flame nor smoke is detected by inputting each of the block images as determining images;
a determination part for determining a fire in the monitor region based on the flame block and the smoke block;
a learning image generation part for dividing the monitor image serving into a plurality of block images as learning images and classifying each of the block images as learning images to a flame learning block image in which flames due to a fire occupy a ratio that is a predetermined ratio or more, a smoke learning block image in which smoke due to a fire occupies a ratio that is a predetermined ratio or more, a normal learning block image without flames or smoke, and a non-learning block image in which the proportion of flames and smoke is less than the predetermined proportion so as to be stored in a learning image storage part; and a learning control part for learning the multi-layer-type neural network by inputting the flame learning block image, smoke learning block image and the normal learning block image excluding the non-learning block image stored in the learning image storage part.

2. The fire monitoring system according to claim 1, wherein the block images divided by the learning image generation part are inputted to the multi-layer-type neural network so as to determine a kind of the block images and by using results of determination, the block images are classified and stored in the learning image storage part.

3. The fire monitoring system according to claim 1, wherein the determination part determines the fire in the monitor region when a distribution of the flame block and/or the smoke block upward and/or expanded as time elapses.

4. The fire monitoring system according to claim 1, wherein the determination part determines the fire in the monitor region based upon a state of a set of flame blocks and/or smoke blocks.

5. The fire monitoring system according to claim 1, further comprising: a monitor part for displaying the monitor image on a screen, wherein the monitor part displays overlaid areas of the flame block and the smoke block on the monitor image so as to be able to recognize the area of the flame block and the smoke block respectively.

6. A fire monitoring system comprising:
an image capturing part for capturing a monitor image in a monitor region;
an image input part for dividing the monitor image into a plurality of block images as determining images by inputting the monitor image;
a first multi-layer-type neural network for determining a flame block in which a flame is detected or a normal block in which no flame is detected by inputting each of the block images as determining images;
a second multi-layer-type neutral network for determining a smoke block in which smoke is detected or a normal block in which no smoke is detected by inputting each of the block images as determining images;
a determination part for determining a fire in the monitor region based on the flame block and the smoke block;
a learning image generation part for dividing the monitor image serving into a plurality of block images as learning images and classifying each of the block images as learning images to a flame learning block image in which flames due to a fire occupy a ratio that is a predetermined ratio or more, a smoke learning block image in which smoke dues to a fire occupies a ratio that is a predetermined ratio or more, a normal learning block image without flames or smoke, and a non-learning block image in which the proportion of flames and smoke is less than the predetermined proportion so as to be stored in a learning image storage part; and a learning control part for learning the first multi-layer-type neural network by inputting the flame learning block image and the normal learning block image stored in the learning image storage part, and learning the second multi-layer-type neural network by for inputting the smoke learning block image and the normal learning block image stored in the learning image storage part.

7. The fire monitoring system according to claim 6, further comprising: a monitor part for displaying the monitor image on a screen, wherein the monitor part displays overlaid areas of the flame block and the smoke block on the monitor image so as to be able to recognize the area of the flame block and the smoke block respectively.

8. The fire monitoring system according to claim 6, wherein the determination part determines the fire in the monitor region when a distribution of the flame blocks and/or the smoke blocks upward and/or expands as time elapses.

* * * * *